Patented Nov. 5, 1946

2,410,792

UNITED STATES PATENT OFFICE 2,410,792

COATED CORD

Theodore R. Ten Broeck, Cuyahoga Falls, Ohio, assignor to Wingfoot Corporation, Akron, Ohio, a corporation of Ohio No Drawing. Application May 27, 1943, Serial No. 488,749

11 Claims. (Cl. 117—138.8)

This invention relates to an improved adhesive for adhering textile fibers or threads to natural and synthetic rubber. More particularly, it relates to an adhesive which brings about a strong union between synthetic rubber of the diene-type and nylon cords.

Recent investigations have shown that pneumatic tires made up with nylon cords in the carcass have greatly improved resistance to puncture and rupture over similar tires constructed with rayon or cotton cords. This is particularly important in the manufacture of airplane tires for heavy aircraft such as bombers, since the landing impact is great and tires of improved design are necessary to meet the severe requirements of such use.

However, nylon cords present problems of adhesion to the rubber of the tire, due to their smooth surface and probably to their chemical nature. Cord adhesives presently available have not given satisfactory union between the cords and the surrounding rubber. For example, casein-natural latex adhesives give moderate adhesions to nylon. Substitution of the natural latex with synthetic latex, say Buna-S latex, improves the adhesion considerably. Maximum results are obtained by the inclusion of a phenol in the synthetic latex adhesive. That is to say, an adhesive composed of casein, Buna-S latex and phenol has given adhesions so great that the cords themselves break before the tension thereon in test pieces pulls them out of the rubber.

The improved adhesive is, of course, subject to modification as to the ingredients and the proportions thereof. Thus, the casein may be replaced by other similar proteins, such as glue, albumin, gelatin, and haemoglobin, or by caseinates, such as calcium caseinate, sodium caseinate, etc.; the synthetic latex may be that of Buna-S (butadiene-styrene rubber), Buna-N (butadiene-acrylonitrile rubber), and other synthetic rubbers made by polymerizing a diene hydrocarbon, particularly a conjugated diene hydrocarbon, with or without another monomer; while the phenolic compound employed may be phenol itself, resorcinol, phloroglucinol, hydroquinone, cresols, xylenols, etc. and salts thereof, such as the alkali-metal salts, e. g., the sodium and potassium salts.

The proportions of the various constituents may vary to a considerable extent. For example, the casein or caseinate may constitute 0.5–10%, the synthetic latex solids from about 4–32% and the phenolic compound from 1–16% of the total adhesive, but the total solids in the adhesive should not exceed 30% and preferably 20%, the remainder being water. In addition to the foregoing, the latex may be replaced in whole or in part by dispersite, a latex made up by the dispersion of reclaimed rubber in water. However, the presence of dispersite is not strictly necessary to obtain the improved adhesions desired. Curing agents such as sulphur, an accelerator, e. g., mercapto-benzo-thiazole, pigments, e. g., zinc oxide, and other compounding ingredients customarily used in the compounding of rubber will also be usually present.

To prove the marked effect of the phenolic compound in adhesives for the adhering of nylon cords to rubber, the following series of tests were made. The results given were obtained by placing in a cord tensile machine ⅜" samples made up of the desired rubber stock, in which were embedded nylon cords coated with the adhesive under test and cured into the rubber. A pull was then applied and a reading taken when the cord drew out of the rubber or broke. The reading, in pounds, indicates the strength of the adhesive over the ⅜" length of cord. When it is considered that the improved adhesion, corresponding to these readings, is tested on a very small length of cord, ⅜", it will be seen that the total improvement in adhesion of a long cord embedded in a rubber tire, or other rubber article, is very great. The results tabulated were the average of five tests in each instance. The adhesive was applied to the cord and dried, then heated one-half hour at a temperature of 270° F. before curing into the rubber, conditions corresponding to the customary drying procedure employed in the preparation of the coated thread. In the following, a 3:8:8 ratio is maintained respectively for the casein, dispersite and latex solids, natural or synthetic.

| | Description | No. of breaks | Adhesion in pounds |
|---|---|---|---|
| (1) | Casein-dispersite-natural rubber latex | 0 | 14.0 |
| (2) | Casein-dispersite-natural rubber latex plus 1% phenol | 0 | 13.4 |
| (3) | Casein-dispersite-Buna-S latex | 0 | 21.8 |
| (4) | Casein-dispersite-Buna-S latex plus 1% phenol | 1 | 27.2 |
| (5) | Casein-dispersite-Buna-S latex plus 0.75% sodium phenate | 4 | 27.8 |
| (6) | Casein-dispersite-Buna-S latex plus 0.75% sodium phenate plus 1% phenol | 5 | 28.4 |

It will be noted from the foregoing data that while improvement in adhesion is not obtained when the phenol is added to an adhesive made up from natural rubber, increased strength is noted when natural latex is replaced in the adhesive by Buna-S latex, but that maximum adhesion is not obtained until both the synthetic latex and phenol are present. Maximum values are indicated by breakage of the cord itself, showing that the rubber adhered so tenaciously to the cord that the test terminated by cord breakage before the adhesive failed.

While certain phenolic compounds have been employed in natural latex adhesives containing casein for their preservative effect on the casein, the improvement in tensile strength imparted to adhesives containing synthetic rubber latices, by such phenols, has not previously been reported. The action of the phenol on the synthetic rubber latex and the protein-latex adhesive is not known, but the physical improvement in the bond is plainly apparent from the foregoing tests.

The adhesive is particularly intended for use with nylon cords or fabric in rubber articles, such as tires, particularly airplane tires, but improvement in adhesion is also observed when rayon cords, and even cotton cords, are treated. By the use of the term "nylon" herein is meant to include not only the condensation products of adipic acid and hexamethylene diamine presently available, but related high molecular straight chain polyamines, such as that of sebacic acid and pentamethylene diamine, resulting from the condensation of a diamine and a dibasic acid. These materials are described at length in U. S. Patents #2,130,523 and #2,130,948. They are there described as synthetic linear polyamides resulting from the interaction of a polybasic acid and a diamine. More particularly, nylon is there described as a synthetic linear polyamide prepared from dibasic carboxylic acids and their amide-forming derivatives combined with an organic diamine whose amino nitrogens carry at least one hydrogen atom and are attached to carbon atoms which are, in turn, attached to other atoms by single bonds only, the reactants being selected so that the sum of their radical lengths exceeds eight. The radical length is defined as the number of atoms in the chain of the radical, each molecule of diamine and each molecule of carboxylic acid contributing this much to the unit length of the polyamide.

Cords treated with the adhesive may be embedded in articles made of synthetic rubber, such as Buna-S, or articles made of natural rubber, improved adhesion being obtained in either case.

It will be apparent that in the practice of the invention various changes may be made in the procedure to be followed and in certain of the materials employed, without departing from the inventive concept. The examples given herein are presented as illustrative merely and it is intended that the patent shall cover by suitable expression in the appended claims, all features of patentable novelty residing in the invention.

I claim:

1. A cord made up of a core of textile material and a coating on said core comprising a mixture of from about 4 parts to about 32 parts of synthetic rubber latex solids, from about .5 part to about 10 parts of a protein and from about 1 part to about 16 parts of one of the group consisting of aromatic hydroxy compounds and their salts.

2. A cord made up of a core of nylon and a coating on said core comprising a mixture of from about 4 parts to about 32 parts of synthetic rubber latex solids, from about .5 part to about 10 parts of a protein and from about 1 part to about 16 parts of a phenolic compound.

3. A cord made up of a core of textile material and a coating on said core comprising a mixture of from about 4 parts to about 32 parts of a synthetic rubber prepared from a copolymer of a conjugated diene hydrocarbon, from about .5 part to about 10 parts of a protein, and from about 1 part to about 16 parts of one of the group consisting of aromatic hydroxy compounds and their salts.

4. A cord made up of a core of nylon and a coating on said core comprising a mixture of from about 4 parts to about 32 parts of butadiene-styrene copolymer latex solids, from about .5 to about 10 parts of casein and from about 1 to about 16 parts of phenol.

5. A rubber article having embodied therein cords made up of a core of textile fibers and a coating on said core of a mixture of from about 4 parts to about 32 parts of the solids from a synthetic-rubber latex prepared from a copolymer of butadiene-1,3, from about .5 part to about 10 parts of a protein and from about 1 part to about 16 parts of a phenolic compound.

6. A rubber article having embodied therein cords made up of a core of nylon and a coating on said core of a mixture of from about 4 parts to about 32 parts of butadiene-styrene copolymer latex solids, from about .5 part to about 10 parts of casein and from about 1 part to about 16 parts of phenol.

7. A cord made up of a core of nylon and a coating on said core comprising a mixture of from about 4 parts to about 32 parts of butadiene-styrene copolymer rubber, from about .5 part to about 10 parts of casein, from about 1 part to about 16 parts of phenol and an effecitve amount of sodium phenate.

8. A cord made up of a core of nylon and a coating on said core comprising a mixture of about 8 parts of butadiene-styrene copolymer rubber, about 3 parts of casein, and about 1 part of phenol.

9. A rubber article having embodied therein cords made up of a core of nylon and a coating on said core of an adhesive comprising from about 6 parts to about 12 parts of a synthetic-rubber prepared from a copolymer of a conjugated diene hydrocarbon, from about 1 part to about 5 parts of a protein, and from about 1 part to about 10 parts of a phenolic compound.

10. A rubber article having embodied therein cords made up of a core of nylon and a coating on said core of an adhesive comprising from about 6 parts to about 12 parts of butadeine-styrene copolymer rubber, from about 1 part to about 5 parts of casein, and from about 1 part to about 10 parts of phenol.

11. A rubber article having embodied therein cords made up of a core of nylon and a coating on said core of a mixture of from about 4 parts to about 32 parts of butadiene-styrene copolymer latex solids, from about .5 part to about 10 parts of casein, and from about 1 part to about 16 parts of an alkali metal phenate.

THEODORE R. TEN BROECK.